United States Patent
Snowdon

(10) Patent No.: US 8,491,228 B2
(45) Date of Patent: Jul. 23, 2013

(54) VACUUM CONVEYING VELOCITY CONTROL APPARATUS AND METHOD FOR PARTICULATE MATERIAL

(76) Inventor: Brian Snowdon, Doncaster (GB)

( * ) Notice: Subject to any disclaimer, the term of this patent is extended or adjusted under 35 U.S.C. 154(b) by 528 days.

(21) Appl. No.: 12/085,080

(22) PCT Filed: Nov. 15, 2006

(86) PCT No.: PCT/GB2006/004264
§ 371 (c)(1),
(2), (4) Date: Sep. 8, 2009

(87) PCT Pub. No.: WO2007/057667
PCT Pub. Date: May 24, 2007

(65) Prior Publication Data
US 2010/0034599 A1    Feb. 11, 2010

(30) Foreign Application Priority Data
Nov. 16, 2005  (GB) .................................. 0523338.2

(51) Int. Cl.
*B65G 53/60* (2006.01)
(52) U.S. Cl.
USPC ............... 406/169; 406/168; 406/14; 406/30; 406/32; 406/151
(58) Field of Classification Search
USPC ................. 406/150, 151, 152, 153, 168, 169, 406/14, 30, 32
See application file for complete search history.

(56) References Cited

U.S. PATENT DOCUMENTS

| | | | | |
|---|---|---|---|---|
| 3,405,738 A | * | 10/1968 | Oka | 406/168 |
| 3,498,003 A | * | 3/1970 | Hulbert, Jr. | 406/168 |
| 3,794,388 A | * | 2/1974 | Westenberg | 406/116 |
| 4,180,186 A | * | 12/1979 | Alphandary | 406/152 |
| 4,261,672 A | * | 4/1981 | Marbach | 406/50 |
| 4,264,243 A | * | 4/1981 | Bentzen-Bilkvist | 406/169 |
| 4,362,442 A | * | 12/1982 | Bentzen-Bilkvist et al. | 406/109 |
| 4,630,975 A | | 12/1986 | Becker | |
| 4,862,649 A | * | 9/1989 | Davis et al. | 451/38 |
| 5,037,246 A | * | 8/1991 | Okano et al. | 406/152 |
| 5,088,860 A | * | 2/1992 | Stockdale et al. | 406/153 |
| 5,341,856 A | * | 8/1994 | Appenzeller | 141/67 |
| 5,575,596 A | * | 11/1996 | Bauer et al. | 406/168 |
| 6,036,407 A | * | 3/2000 | Nester | 406/109 |
| 6,202,576 B1 | * | 3/2001 | Nagl et al. | 110/342 |
| 6,368,028 B1 | * | 4/2002 | Nester | 406/109 |
| 6,523,721 B1 | * | 2/2003 | Nomoto et al. | 222/77 |
| 6,588,988 B2 | * | 7/2003 | Zlotos | 406/14 |
| 6,634,833 B2 | * | 10/2003 | Gillespie | 406/84 |
| 7,228,990 B2 | * | 6/2007 | Schmidt | 222/77 |
| 7,785,044 B2 | * | 8/2010 | Sundholm | 406/48 |

FOREIGN PATENT DOCUMENTS

| | | |
|---|---|---|
| GB | 1 474 338 | 5/1977 |
| GB | 2 125 358 A | 3/1984 |
| WO | WO 94/24031 | 10/1994 |
| WO | WO 00/17079 AU | 3/2000 |

* cited by examiner

*Primary Examiner* — Joseph A Dillon, Jr.
(74) *Attorney, Agent, or Firm* — Dickinson Wright, PLLC

(57) ABSTRACT

An apparatus and a method for controlling the velocity of a particulate material conveyed by a gas flow under negative pressure in a duct said device comprising means for separating the flow into first and second streams. The first stream has a relatively high particulate material content and the second stream has a relatively low particulate material content. The flow of the second stream is restricted for example by a flow restricting or constricting orifice or valve. The duct diameter may increase incrementally along its length.

30 Claims, 3 Drawing Sheets

VACUUM CONVEYING VELOCITY CONTROL APPARATUS AND METHOD FOR PARTICULATE MATERIAL

CROSS-REFERENCE TO RELATED APPLICATION

This application claims a benefit of priority from PCT Application No. PCT/GB2006/004264, filed 15 Nov. 2006, which itself claims a benefit of priority from GB Application 0523338.2, filed 16 Nov. 2005. The disclosures of both PCT/GB2006/004264 and GB Application 0523338.2 are incorporated herein by reference in their entireties.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

FIELD OF THE INVENTION

This invention relates to the conveying of particulate material suspended or entrained in a gas and conveyed with the gas along a duct at a controlled velocity under negative pressure. Embodiments of the invention relate to the conveyance of catalyst from a reactor such as an oil refinery reactor to a cyclone, hopper or other receiving vessel under negative pressure. In the context of the present specification the term "negative pressure" relates to a pressure less than that at the initial location of the particulate material, and normally less than atmospheric pressure.

BACKGROUND OF THE INVENTION

Catalyst materials used within oil refinery reactor vessels are routinely changed and the catalyst material is either discarded (if it is significantly damaged) or cleaned and re-used. Conventionally the catalyst is unloaded from the reactor vessel under vacuum. Catalyst is expensive and therefore damage to the catalyst has a significant impact on costs. Analogous problems occur with the conveying of other particulate materials, such as fragile or breakable particulate materials.

The existing vacuum systems which are used to draw particulate material such as catalyst from inside a contained location such as a containment vessel such as (for example a reactor) and through to access holes to a receiving vessel such as a cyclone, hopper or the like cause a considerable amount of damage to the particulate material, with up to 60% of the material being scrapped in the case, for example, of a catalyst material.

One of the causative factors of this damage within the existing systems is that the velocity of the particulate material is uncontrolled in the conveying path (usually a duct or hose) which extends from the pick-up point in the first vessel (e.g. the reactor) to the receiving (second) vessel (e.g. a hopper or cyclone). Furthermore the velocity of the particulate material on entry into the receiving vessel is very high due to the very high expansion rate of the conveying gas as it changes from atmospheric pressure at the pick-up point in the first vessel, to approximately ⅓ of a bar absolute in the receiving vessel (e.g. hopper or cyclone). This has the effect of increasing conveying velocity from approximately 15 m/sec (which represents an exemplary minimum pickup velocity) or more to approximately 45 m/sec at the receiving vessel. This latter velocity tends to cause severe breakage of particulate material such as catalyst in the terminal part(s) of the duct or hose near the receiving vessel and on the internal walls of the receiving vessel itself.

The present invention therefore seeks to provide a device, system or apparatus which reduces the damage caused to fragile particulate material, such as catalyst, as it is conveyed under negative pressure from a first vessel (such as a reactor) to a receiving vessel such as a hopper or cyclone.

The present invention further or alternatively seeks to enable the use of substantially similar equipment, devices or apparatus, with any necessary minor alterations or changes of configuration, both to unload under negative pressure particulate material such as spent catalyst from a first vessel such as a reactor and also to load particulate material such as catalyst with compressed air into a first vessel such as a reactor under positive pressure. This latter loading process of leading under positive pressure is described in our co-pending International patent application No. PCT/GB2006/002363.

SUMMARY OF THE DISCLOSURE

According to a first aspect of the invention there is provided a device for controlling the velocity of particulate material being conveyed within a gas stream under negative pressure from a first location along a duct and into a receiving vessel at a second location, said device being configured to be located at or adjacent the discharge end of said duct and comprising means for separating the stream of particulate material and gas into a first stream containing a relatively high proportion of particulate material to gas and a second stream containing relatively low proportion of particulate material to gas and means for restricting the gas flow in said second stream.

In one embodiment of the invention the means for restricting the gas flow in the second stream is a flow restricting or constricting orifice. This orifice may, for example, be provided on an annular orifice plate located within the outlet for the gas stream. In other words, the orifice comprises a gas through-flow path defined in a said annular orifice plate.

In another embodiment of this aspect of the invention, the device is configured to operate at a pressure in the second vessel of about ½ to about ⅓ of a bar absolute. The pressure at the point where the particulate material enters the conveyance duct is approximately atmospheric pressure.

In still another embodiment the device is operatively located in the flow path of the conveying gas outlet of the receiving vessel. In a variation of this embodiment the device comprises a valve operative to control the flow of conveying gas through the said outlet.

In yet another embodiment of this aspect of the invention the device comprises detection means operative to determine when the level of particulate material in the second vessel has reached a predetermined level. The valve may be operable to prevent flow of conveyed particulate material into the second vessel when said predetermined level is reached.

In other embodiments of the invention, the particulate material is a granular material such as a fragile particulate material. Examples of such material include materials selected from the group comprising crystalline sugars, soap powder, plastic pellets, catalysts and similarly fragile materials. In one variation of this aspect of the invention, the particulate material is a catalyst. The catalyst may be for use in oil refinery reactors. Catalyst materials tend to be particularly fragile and may, for example, be made from alumina ceramic needles of about 6 mm long and about 0.5 mm in diameter.

In embodiments of this aspect of the invention, the content of particulate material in the second stream is minimal.

The second stream may be vented, directly or indirectly, to atmosphere.

In further embodiments of the invention a variable flow control device, such as a variable orifice flow control valve, is provided so that the velocity of the conveying gas can be actively adjusted. In these embodiments a velocity meter is located in the discharge side of the exhauster and the orifice is replaced by said variable flow control device. The variable flow control device acts to adjust the flow of gas in response to the velocity of the exhausted gas, as measured by the velocity meter, so as to maintain a fixed volume flow of gas at atmospheric pressure into the duct.

Thus, in embodiments of the invention, a variable flow control device (such as a variable orifice flow control valve) is provided which enables the maintenance of a fixed volume of gas flow at atmospheric pressure into the duct in response to an air flow velocity meter located on the discharge side of the vacuum generating means.

According to a second aspect of the present invention there is provided apparatus for conveying a particulate material from a first location to a second location within a gas stream under negative pressure, said apparatus comprising a duct for conveying said particulate material from said first to said second location, a receiving vessel at said second location for receiving said particulate material and a device located at or adjacent the discharge end of said duct and comprising means for separating the stream of particulate material and gas into a first a first stream containing a relatively high proportion of particulate material to gas and a second stream containing relatively low proportion of particulate material to gas and means for restricting the gas flow in said second stream.

In an embodiment of this second aspect of the invention the diameter of the duct increases along its length, that is, between the entry and exit points of the particulate matter for conveyance such that the diameter at the exit point is greater than at the entry point. This increase in diameter may be incremental along the length of the duct. By increasing the duct diameter progressively along the length of the duct, the velocity increase as a result of the pressure change between inlet of the duct and the outlet of the duct, is considerably reduced.

In embodiments of this aspect of the invention, the apparatus further comprises a vacuum generating means for creating a vacuum in said apparatus. The vacuum generating means can generate a vacuum in said receiving vessel.

In further embodiments of this aspect of the invention, the means for restricting the gas flow is a flow restricting orifice. The orifice may be within an annular orifice plate.

In other embodiments of this aspect of the invention, the operational pressure in the receiving vessel is from about ½ to about ⅓ bar absolute.

In further embodiments of the second aspect of the invention the said device is located in the flow path of the conveying gas outlet of the receiving vessel.

In still further embodiments of the apparatus of the second aspect of the invention, said device comprises, or further comprises, a valve operative to control the flow of conveying gas through said outlet.

In yet further embodiments of this aspect of the invention, the apparatus further comprises detection means operative to determine when the level of particulate material in the receiving vessel has reached a predetermined level. The valve may be operable to prevent flow of conveyed particulate material into the second vessel when said predetermined level is reached.

In this aspect of the invention the particulate material may be a granular material such as a fragile particulate material. Examples of such materials include those selected from the group comprising crystalline sugars, soap powder, plastic pellets, catalysts and similarly fragile materials.

In one embodiment of this aspect of the invention, the particulate material is a catalyst. The catalyst may be for use in oil refinery reactors.

In yet further embodiments of the second aspect of the invention, the content of particulate material in the second stream is minimal.

The second stream may be vented directly or indirectly to atmosphere.

In embodiments of the invention, the apparatus is provided with a variable flow control device (such as a variable orifice flow control valve) which enables the maintenance of a fixed volume of gas flow at atmospheric pressure into the duct in response to an air flow velocity meter located on the discharge side of the vacuum generating means.

In particular in these embodiments said device comprises or includes a variable flow control means and wherein the apparatus further comprises an air flow velocity meter located on the discharge side of the vacuum generating means, whereby a predetermined volume of gas flow at atmospheric pressure into the duct is operatively be maintained by adjustment of said variable flow control means in response to the air flow measured by said air flow velocity meter.

By using the principle of exit gas velocity control combined with the use of an expanding duct diameter, excessive conveying velocity can be avoided when unloading particulate material such as catalyst under vacuum, thus reducing product breakage from between approximately 40% to 60% to less than approximately 10%. This adds considerable value to the unloaded particulate since, in the case for example of a catalyst a greater proportion remains in a state in which it can be re-used.

The apparatus according to this second aspect of the invention may further comprise a first vessel at the first location, within which the particulate material is initially contained. The first vessel may be an oil refinery reactor. The receiving vessel is a cyclone or hopper. The use of the apparatus according to the invention within this context enables the transfer of catalyst within a negative pressure system from the oil refinery reactor to the cyclone/hopper with negligible or minimal structural damage to the catalyst.

In another embodiment of the second aspect of the invention the apparatus further comprises a further pressure vessel (preferably a lock hopper or lock vessel) located downstream of the receiving vessel whereby particulate material can be transferred from the receiving vessel into the further pressure vessel without adjustment of the pressure in the receiving vessel. This arrangement enables the maintenance of a constant negative pressure within the apparatus. In other words, the pressure in the second (receiving) vessel does not then need to be equalized with atmospheric pressure in order to discharge the particulate material from the second vessel.

According to a third aspect of the invention there is provided a method of controlling the velocity of flow of a particulate material within a conveyance gas along a conveyance duct positioned between two vessels, said method comprising locating a device at the discharge end of the conveyance duct, wherein said device comprises means for separating the stream of particulate material and gas into first and second streams containing relatively high and low proportions respectively of particulate material to gas and means for restricting the gas flow in said second stream.

According to a fourth aspect of the invention there is provided a method of transferring a particulate material within a gas stream between a first and second vessel via a conveyance duct, and for controlling the flow velocity of the gas stream through said duct, said method comprising the steps of;
a) locating a device according to the first aspect of the invention at the discharge end of a conveyance duct;
b) generating a positive or negative pressure system within said duct to transfer said particulate material.

In one embodiment of the method, particulate material, for example catalyst, is transferred within a positive pressure system from a dense flow pot, ISO-VEYOR™, rotary valve or road/rail tanker into an oil refinery reactor. An example of an ISO-VEYOR™ is described in WO2005/087622 the contents of which are incorporated herein by reference.

In an alternative embodiment of the method particulate material, for example catalyst, is transferred within a negative pressure system from an oil refinery reactor to a hopper/cyclone.

Therefore according to the invention the same device can be used for both vacuum unloading of a particulate material such as used catalyst from a first vessel (such as a reactor) and low velocity pneumatic loading of the first vessel (e.g. reactor) with particulate material such as new or refreshed catalyst.

BRIEF DESCRIPTION OF THE DRAWINGS

For a better understanding of the invention and to show how the same may be carried into effect, reference will be made, by way of example only, to the following drawings, in which.

WRITTEN DESCRIPTION

Figure 1:
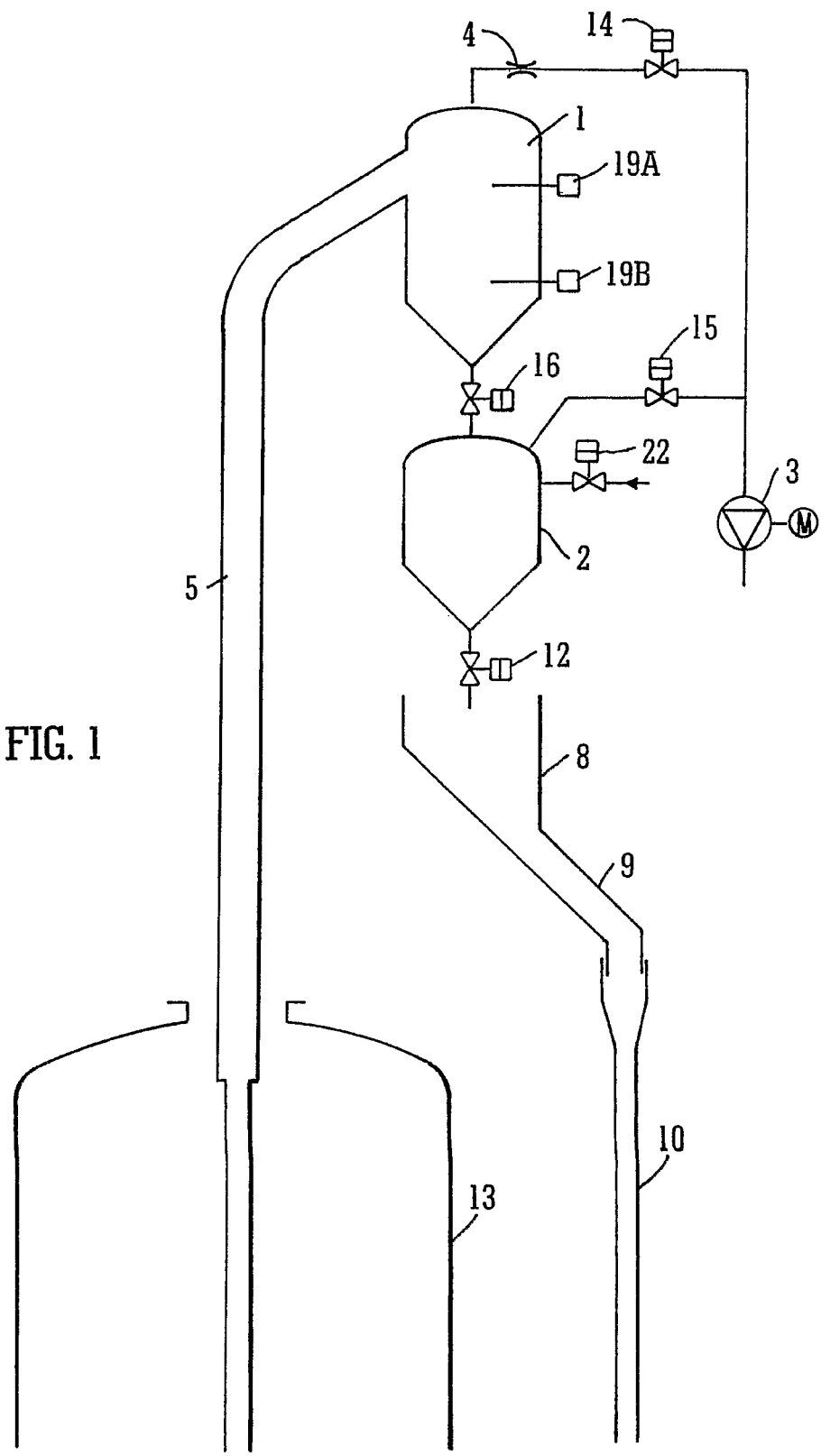
FIG. 1 is a schematic illustration of a device and apparatus of the invention in use for the transfer of catalyst from an oil refinery reactor.

FIG. 1 illustrates the device and apparatus of the invention being used to convey catalyst from a reactor 13. Vacuum pump/exhauster 3 communicates with receiving vessel 1 via a valve 14 and thereby creates a vacuum of approximately ⅓ bar absolute in vessel 1 which causes the catalyst to be drawn up vacuum hose 5. Although not specifically illustrated in the drawings, the diameter of vacuum hose 5 increases at intervals from the pick-up point 6 to the receiving vessel 1 in order to minimize the velocity increase between the pick-up point 6 and the entry point to the receiving vessel 1. Orifice 4 is used to control the flow of conveying gas and thereby limit the conveying velocity in vacuum hose 5.

Initially, valve 14 is open and all other valves are closed so that the vacuum pump 3 communicates with receiving (second) vessel 1 whereby catalyst is drawn through hose 5 and into receiving vessel 1. Vessel 1 is provided with probes, sensors or the like 19A and 19B which determine respectively when the level of catalyst is above or below predetermined levels. When the catalyst level in vessel 1 reaches the predetermined level determined by probe 19A, valve 15 is opened so that the vacuum level in lock vessel 2 is the same as the vacuum level in vessel 1. Valve 16 is then opened so that the catalyst falls by gravity into vessel 2. When probe 19B determines that vessel 1 is empty, valves 15 and 16 are closed and valve 22 is opened thereby to equalize pressure between the inside and outside of lock vessel 2, typically to atmospheric pressure. Valve 12 is now opened and the catalyst falls into collection hopper 8 and via chute 9 into the 'lay-flat' hose 10 where it can fall by gravity without breakage to ground level where it is fed into container 11 (not shown). When vessel 2 is empty, valve 12 is closed and vessel 2 is ready to re-fill again from vessel 1.

Figure 2:
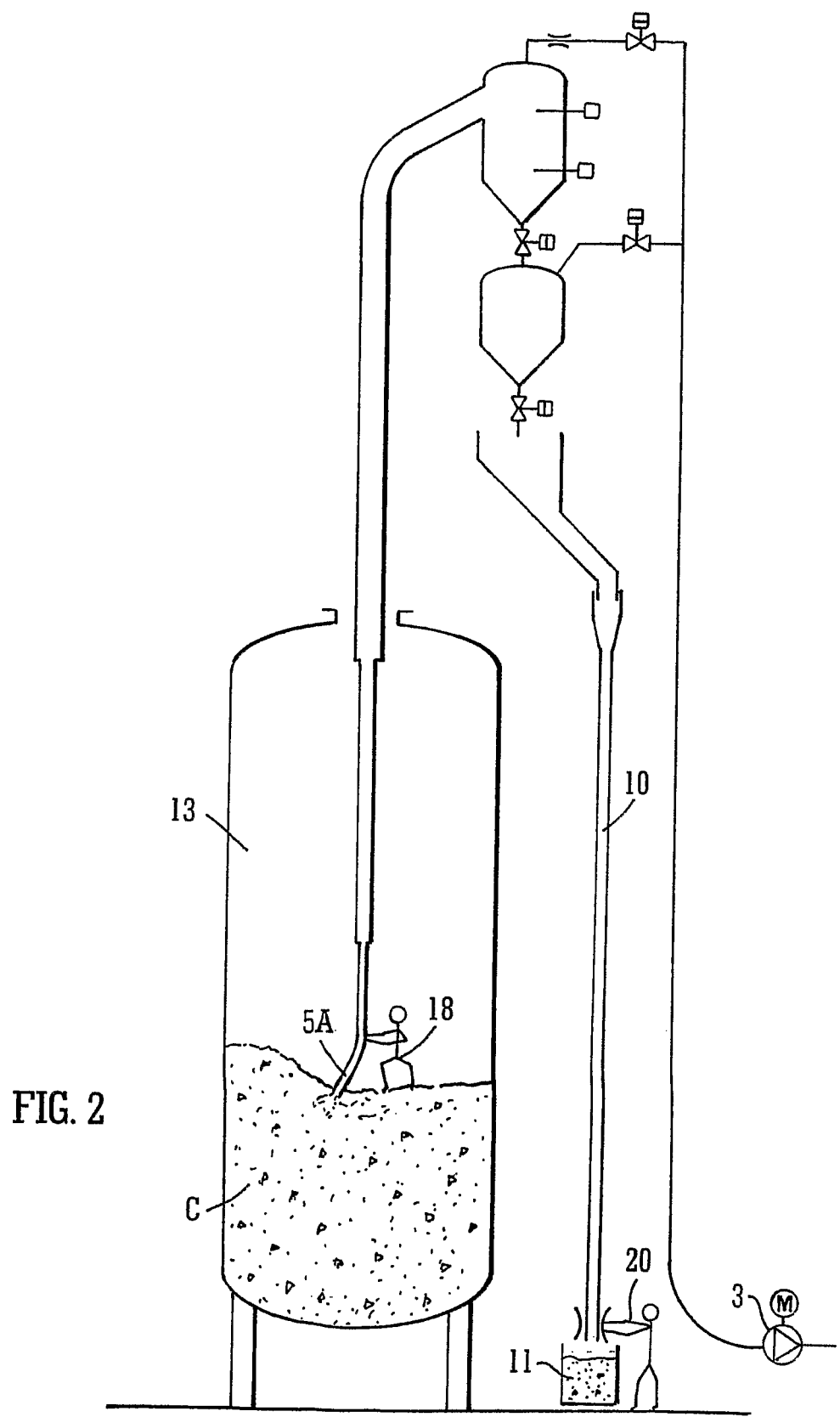
FIG. 2 is a schematic illustration of a device and apparatus of the invention showing the overall view of the complete oil refinery reactor with catalyst collection at ground level.

FIG. 2 shows the apparatus of the invention in use. Operator 18 controls the pick up point of hose end portion 5A which depends from hose 5. Operator 18 keeps the pick up point buried in catalyst C. Operator 20 controls the discharge of catalyst in the 'lay-flat' hose 10 by restricting the outlet of the hose so that the hose remains full and the catalyst is not damaged by falling down the hose. Bin 11 is used to collect the catalyst for transport to catalyst re-cycling plant.

As can be seen from FIGS. 1 and 2, receiving (second) vessel 1 is provided with a flow constricting or restricting orifice 4 in the outlet flow path by which the second stream containing a relatively low proportion of particulate material to gas exits the receiving vessel 1. Flow restricting orifice 4 causes an effective increase of pressure in vessel whereby the velocity of the particulate material in the conveying gas is made less on entry to the receiving vessel 1 than would be the case in the absence of orifice 4. Damage to the particulate material is thereby significantly reduced. Also, because the flow restricting orifice 4 is located in the flow path of the second stream, which contains relatively little (if any) particulates material there is no danger of damage to the particulate material by collision of the particulate material with an orifice defining plate. Such collision damage would occur were the orifice to be located in hose or duct 5.

In a variation of the apparatus illustrated in FIGS. 1 and 2, the flow restricting orifice 4 takes the form of a variable flow control device (such as a variable orifice flow control valve). By using a variable flow control device, it is possible to maintain a fixed volume of gas flow at atmospheric pressure into the duct 8 by adjusting the variable flow control device in response to the output of an air flow velocity meter M located on the discharge side of the vacuum generating means 3.

Figure 3:
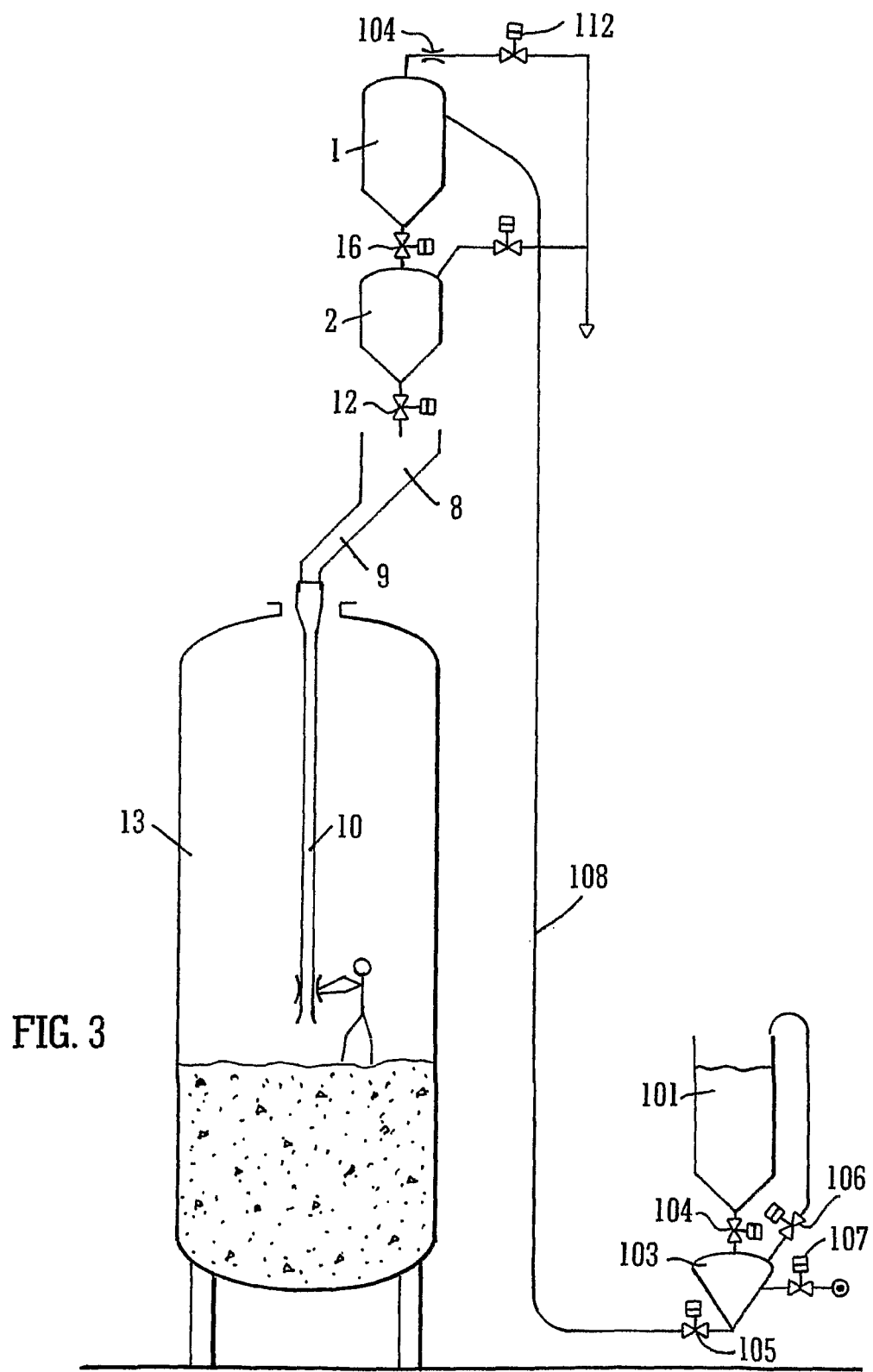
FIG. 3 is a schematic illustration an embodiment of the invention showing the apparatus and device of the invention is a modified form positioned on the oil refinery reactor top when being used to load the reactor.

FIG. 3 illustrates the conversion of the apparatus of FIGS. 1 and 2 for use in loading particulate material such as catalyst into a vessel such as an oil refinery reactor. Hopper 8 is moved from its discharging position as shown in FIGS. 1 and 2 to its loading position as shown in FIG. 3, such as by rotating hopper 8 by about 180°. Chute 9 and hose 10 now feed catalyst into the reactor 13 as described in the co-pending International patent application No. PCT/GB2006/002363, the contents of which are hereby incorporated by reference. In summary, FIG. 3 shows the device and apparatus of the invention using a dense phase blowpot system for loading of catalyst into a reactor. Storage hopper 101 (forming the initial location of the catalyst) holds material which is to be conveyed to reactor 13. For transfer of the catalyst into blowpot 103, initially conveying air valve 107 and the outlet valve 105 are closed. Vent valve 106 is open. Blowpot 103 is filled by gravity through open inlet valve 104. When the first vessel (blowpot) 103 is full, the inlet valve 104 and vent valve 106 close. Conveying gas inlet valve 107 and the outlet valve 105 now open and catalyst is conveyed down pipe (duct) 108 towards receiving vessel 1. Receiving vessel 1 has an outlet valve 16. The receiving vessel 1 has an outlet whereby conveying gas vents from vessel 1 through constricting orifice 104. Thus the stream of particulate material and gas separates into a first stream containing a relatively high proportion of particulate material (catalyst) which is retained in the receiving vessel and a second stream containing a relatively low proportion of particulate material to gas which vents through orifice 104 and valve 112. When the receiving vessel 1 is full, the pressure in lock hopper 2 is equalized with that of the receiving vessel 1 and catalyst is transferred from the receiving vessel 1 to the lock hopper 2 through outlet valve 16. Valve 16 is then closed and lock hopper 2 is brought to atmospheric pressure prior to discharge of the catalyst into reactor 13 via hopper 8, chute 9 and hose 10.

Of course, the foregoing is merely illustrative of the present invention, and those of ordinary skill in the art will appreciate that many additions and modifications to the present invention, as set out in this disclosure, are possible without departing from the spirit and broader aspects of this invention as defined in the appended claims.

The invention claimed is:

1. Apparatus for conveying a particulate material from a first location to a second location within a gas stream under negative pressure, said apparatus comprising:
   a duct for conveying said particulate material from said first to said second location, a receiving vessel at said second location for receiving said particulate material, and a device located proximate a discharge end of said duct and comprising means for separating the stream of particulate material and gas into a first stream containing a relatively high proportion of particulate material to gas and a second stream containing relatively low proportion of particulate material to gas, and means for restricting the gas flow in said second stream;
   further comprising a pressure vessel located downstream of the receiving vessel, the pressure vessel separated from the receiving vessel by a valve selectively operative to permit the transfer of particulate material between said receiving vessel and said pressure vessel, a vacuum generating means for generating a vacuum in said receiving vessel, and a valve selectively operative to create a vacuum in said pressure vessel matching the vacuum in said receiving vessel;
   wherein the apparatus is characterized by a filling state, in which particulate material is received in said receiving vessel and said valve operative to permit transfer of particulate material between said receiving vessel and said pressure vessel is closed, and a transfer state, in which, following operation of the valve to create a vacuum in said pressure vessel matching the vacuum in said receiving vessel, said valve operative to permit transfer of particulate material between said receiving vessel and said pressure vessel is opened so that said particulate material is transferred from said receiving vessel into said pressure vessel without adjustment of the pressure in said receiving vessel.

2. Apparatus according to claim 1, wherein the duct is characterized by a diameter which increases along its length.

3. Apparatus according to claim 2, wherein said increase in diameter is incremental.

4. Apparatus as claimed in claim 1, wherein the means for restricting the gas flow is a flow restricting orifice.

5. Apparatus as claimed in claim 1, wherein the operational pressure in the receiving vessel is from about ½ to about ⅓ bar absolute.

6. Apparatus claimed in claim 1, wherein the receiving vessel comprises a conveying gas outlet, and said device is located in the flow path of the conveying gas outlet.

7. Apparatus as claimed in claim 6, wherein said device comprises a valve operative to control the flow of conveying gas through said conveying gas outlet.

8. Apparatus as claimed in claim 1, further comprising detection means operative to determine when the level of particulate material in the receiving vessel has reached a predetermined level.

9. Apparatus as claimed in claim 7, further comprising a valve operative to control the flow of conveying gas through said conveying gas outlet, said valve operable to prevent flow of conveyed particulate material into the receiving vessel when said predetermined level is reached.

10. Apparatus as claimed in claim 1, wherein the second stream is vented to atmosphere.

11. Apparatus according to claim 1, wherein said device comprises a variable flow control means and wherein the apparatus further comprises an air flow velocity meter located on a discharge side of the vacuum generating means, whereby a predetermined volume of gas flow at atmospheric pressure into the duct is operatively maintained by adjustment of said variable flow control means in response to the air flow measured by said air flow velocity meter.

12. Apparatus of claim 1, further comprising a first vessel at the first location, within which the particulate material is initially contained.

13. Apparatus as claimed in claim 12, wherein the first vessel is an oil refinery reactor.

14. Apparatus as claimed in claim 13, wherein the receiving vessel is a hopper.

15. Apparatus for conveying a particulate material from a first location to a second location within a gas stream under negative pressure, said apparatus comprising:
   a duct for conveying said particulate material from said first to said second location;
   a receiving vessel at said second location for receiving said particulate material;
   a pressure vessel located downstream of the receiving vessel, the pressure vessel separated from the receiving vessel by a closure which is selectively openable to permit the transfer of said particulate material between said receiving vessel and said pressure vessel, and a valve selectively operable to create in the pressure vessel, said a vacuum matching the vacuum in said receiving vessel so that, upon opening the closure between said receiving vessel and said pressure vessel, particulate material is transferred from said receiving vessel into said pressure vessel without adjustment of the pressure in said receiving vessel; and
   at least one vacuum pump for generating said vacuum in said receiving vessel and said vacuum in said pressure vessel; and
   wherein the apparatus is characterized by a filling state in which particulate material is received in said receiving vessel and said closure is closed, and a transfer state in which, following operation of said valve to create a vacuum in said pressure vessel matching the vacuum in said receiving vessel, said closure is opened so that said particulate material is transferred from said receiving vessel into said pressure vessel without adjustment of the pressure in said receiving vessel.

16. Apparatus according to claim 15, wherein the duct is characterized by a diameter which increases along its length.

17. Apparatus according to claim 16, wherein said increase in diameter is incremental.

18. Apparatus as claimed in claim 15, wherein the operational pressure in the receiving vessel is from about ½ to about ⅓ bar absolute.

19. Apparatus according to claim 15, further comprising a device located proximate a discharge end of said duct and comprising means for separating the stream of particulate material and gas into a first stream containing a relatively high proportion of particulate material to gas and a second stream containing relatively low proportion of particulate material to gas, and means for restricting the gas flow in said second stream.

20. Apparatus as claimed in claim 19, wherein the means for restricting the gas flow is a flow restricting orifice.

21. Apparatus claimed in claim 19, wherein the receiving vessel comprises a conveying gas outlet, and said device is located in the flow path of the conveying gas outlet.

22. Apparatus as claimed in claim 21, wherein said device comprises a valve operative to control the flow of conveying gas through said conveying gas outlet.

23. Apparatus as claimed in claim 19, wherein the second stream is vented to atmosphere.

24. Apparatus according to claim 19, wherein said device comprises a variable flow control means, and wherein the apparatus further comprises an air flow velocity meter located on a discharge side of the vacuum generating means, whereby a predetermined volume of gas flow at atmospheric pressure into the duct is operatively maintained by adjustment of said variable flow control means in response to the air flow measured by said air flow velocity meter.

25. Apparatus as claimed in claim 15, further comprising detection means operative to determine when the level of particulate material in the receiving vessel has reached a predetermined level.

26. Apparatus as claimed in claim 25, further comprising a valve operative to control the flow of conveying gas through said conveying gas outlet, said valve operable to prevent flow of conveyed particulate material into the receiving vessel when said predetermined level is reached.

27. Apparatus of claim 15, further comprising a first vessel at the first location, within which the particulate material is initially contained.

28. Apparatus as claimed in claim 27, wherein the first vessel is an oil refinery reactor.

29. Apparatus as claimed in claim 28, wherein the receiving vessel is a hopper.

30. Apparatus according to claim 15, wherein said valve is disposed between said at least one vacuum pump and said pressure vessel.

* * * * *